United States Patent
Baba et al.

(10) Patent No.: US 9,563,042 B2
(45) Date of Patent: Feb. 7, 2017

(54) OPTICAL SYSTEM AND OPTICAL APPARATUS

(71) Applicant: FUJIFILM Corporation, Tokyo (JP)

(72) Inventors: Tomoyuki Baba, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/834,747

(22) Filed: Aug. 25, 2015

(65) Prior Publication Data
US 2016/0077332 A1 Mar. 17, 2016

(30) Foreign Application Priority Data

Sep. 11, 2014 (JP) .................................. 2014-184821

(51) Int. Cl.
*G02B 9/62* (2006.01)
*G02B 13/16* (2006.01)
*G02B 27/14* (2006.01)

(52) U.S. Cl.
CPC ................ *G02B 13/16* (2013.01); *G02B 9/62* (2013.01); *G02B 27/149* (2013.01)

(58) Field of Classification Search
None
See application file for complete search history.

(56) References Cited

U.S. PATENT DOCUMENTS 3,645,605 A * 2/1972 Nakagawa ............. G02B 13/04
359/739
4,913,540 A 4/1990 Minefuji 6,124,978 A * 9/2000 Yoneyama ............. G02B 13/02
359/649
2015/0268455 A1 9/2015 Yamamoto
2016/0131874 A1* 5/2016 Tang .................. G02B 13/0045
359/708

FOREIGN PATENT DOCUMENTS

| DE | 160 501 | 8/1983 |
| DE | 10 2015 103 707 A1 | 9/2015 |
| JP | 2-40607 A | 2/1990 |
| JP | 2000-39555 A | 2/2000 |

OTHER PUBLICATIONS

German Search Report dated Jul. 27, 2016, issued in corresponding German patent application No. 10 2015 113 661.9.

* cited by examiner

*Primary Examiner* — Darryl J Collins
*Assistant Examiner* — Gary O'Neill
(74) *Attorney, Agent, or Firm* — Birch, Stewart, Kolasch & Birch, LLP (57) ABSTRACT

An optical system consists essentially of, in order from the magnification side, a first lens having a positive refractive power with a convex surface on the magnification side, a second lens having a negative refractive power, a third lens having a negative refractive power, a fourth lens having a positive refractive power, a fifth lens having a positive refractive power, and a sixth lens having a positive refractive power, wherein the following conditional expressions (1) and (2) are satisfied:

$$0.17 < D2/f < 0.80 \quad (1)$$

$$-60 < vd1 - vd2 < -15 \quad (2)$$

where
D2: distance on the optical axis between the first lens and the second lens
f: focal length of the entire system
vd1: Abbe number of the first lens with reference to d-line (Continued)

EXAMPLE 1 vd2: Abbe number of the second lens with reference to d-line.

16 Claims, 9 Drawing Sheets

FIG.1 EXAMPLE 1

FIG.2 EXAMPLE 2

FIG.3 EXAMPLE 3

FIG.4  EXAMPLE 4

FIG.5  EXAMPLE 5

OPTICAL SYSTEM AND OPTICAL APPARATUS

CROSS-REFERENCE TO RELATED APPLICATIONS

The present application claims priority under 35 U.S.C. §119 to Japanese Patent Application No. 2014-184821 filed on Sep. 11, 2014. The above application is hereby expressly incorporated by reference, in its entirety, into the present application.

BACKGROUND

The present invention relates to an optical system and an optical apparatus, and more specifically to an optical system which is favorably used, for example, as a projection optical system used for a projection display apparatus or an imaging optical system used for a digital camera, video camera, or the like, and an optical apparatus equipped with the optical system.

Recently, the market for projection display devices has been expanding significantly with a wide spread use of personal computers. As a light valve that performs optical modulation in a projection display device, a transmissive or reflective liquid crystal display device, a digital micromirror device (DMD®) having micromirrors disposed regularly, and the like are known. Among them, the DMD device using micromirrors is suitable for downsizing, as it has a high response speed and allows for a configuration in which illumination light of each of three primary colors of light is sequentially projected on a single-plate light valve in time division.

Along with an increase in demand for mobile applications, small projection display devices are required, and it is preferable, for that purpose, to use a projection optical system configured compact with a less number of lenses. Further, downsizing is also required for digital cameras, video cameras, and the like, as well as for imaging optical systems used for these. For optical systems composed of six lenses as a whole, those described, for example, in Japanese Unexamined Patent Publication No. 2000-039555 and Japanese Unexamined Patent Publication No. 2(1990)-040607 are known.

SUMMARY

Recently, high pixelation of light valves has been advancing in projection display devices and high pixelation of image sensors has been advancing in digital imaging devices. This requires optical systems used for these devices to have a small F-number and higher performance with well corrected aberrations, including chromatic aberration. Further, while being configured compact, projection optical systems need to ensure a back focus that allows a color combining optical system or the like to be inserted between the light valve and the optical system.

The market demands for optical systems that simultaneously satisfy the foregoing requirements. The lens system described in Japanese Unexamined Patent Publication No. 2000-039555, however, requires further improvement in the performance to support the recent high resolution light valves. The lens system described in Japanese Unexamined Patent Publication No. 2(1990)-040607 has a large F-number.

The present invention has been developed in view of the circumstances described above, and it is an object of the present invention to provide an optical system configured compact, yet has a small f-number, ensures a back focus of an appropriate length, and has high optical performance capable of supporting the recent high pixelation. It is a further object of the present invention to provide an optical apparatus equipped with the optical system.

A first optical system of the present invention consists essentially of, in order from the magnification side, a first lens having a positive refractive power with a convex surface on the magnification side, a second lens having a negative refractive power, a third lens having a negative refractive power, a fourth lens having a positive refractive power, a fifth lens having a positive refractive power, and a sixth lens having a positive refractive power, wherein the following conditional expressions (1) and (2) are satisfied:

$$0.17 < D2/f < 0.80 \quad (1)$$

$$-60 < vd1 - vd2 < -15 \quad (2)$$

where

D2: distance on the optical axis between the first lens and the second lens f: focal length of the entire system vd1: Abbe number of the first lens with reference to d-line vd2: Abbe number of the second lens with reference to d-line.

In the first optical system of the present invention, the following conditional expression (3) is preferably satisfied:

$$0.25 < f/f1 < 0.70 \quad (3)$$

where f1: focal length of the first lens.

A second optical system of the present invention consists essentially of, in order from the magnification side, a first lens having a positive refractive power with a convex surface on the magnification side, a second lens having a negative refractive power, a third lens having a negative refractive power, a fourth lens having a positive refractive power, a fifth lens having a positive refractive power, and a sixth lens having a positive refractive power, wherein the following conditional expressions (1) and (3) are satisfied:

$$0.17 < D2/f < 0.80 \quad (1)$$

$$0.25 < f/f1 < 0.70 \quad (3)$$

where

D2: distance on the optical axis between the first lens and the second lens f: focal length of the entire system f1: focal length of the first lens.

In the first and the second optical systems of the present invention, any one or any combination of the following conditional expressions (1-1) to (3-1) is satisfied:

$$0.20 < D2/f < 0.55 \quad (1-1)$$

$$-50 < vd1 - vd2 < -18 \quad (2-1)$$

$$0.30 < f/f1 < 0.60 \quad (3-1)$$

where

D2: distance on the optical axis between the first lens and the second lens f: focal length of the entire system vd1: Abbe number of the first lens with reference to d-line vd2: Abbe number of the second lens with reference to d-line f1: focal length of the first lens.

Further, in the first and the second optical systems of the present invention, each lens has a shape described below. The magnification side surface of the third lens is preferably a concave surface. The second lens is preferably a meniscus lens with a concave surface on the reduction side. The reduction side surface of the fourth lens is preferably a convex surface. The reduction side surface of the fifth lens is preferably a convex surface. The fifth lens is preferably a biconvex lens. The magnification side surface of the sixth lens is preferably a convex surface.

An optical apparatus of the present invention is equipped with the optical system of the present invention described above.

The foregoing "magnification side" refers to the projected side (screen side), if the optical system of the present invention is used as a projection optical system, while if it is used as an imaging optical system, refers to the subject side. The foregoing "reduction side" refers to the original image display area side (light valve side), if the optical system of the present invention is used as a projection optical system, while if it is used as an imaging optical system, refers to the image side.

The foregoing "consists essentially of" intends that the optical system may include a lens having substantially no refractive power, an optical element other than a lens, such as a stop, a mask, a cover glass, a filter, and the like, a lens flange, a lens barrel, and a mechanical component, such as a camera shake correction mechanism, in addition the constituent elements described above.

The sign of refractive power and the surface shape of a lens are considered in the paraxial region if the lens includes an aspherical surface unless otherwise specifically described.

According to the present invention, in a system composed of six lenses of positive, negative, negative, positive, positive, and positive, in order from the magnification side, the shape of the first lens is set appropriately and the system is set to satisfy predetermined conditional expressions. This allows an optical system configured compact, yet has a small f-number, ensures a back focus of an appropriate length, and has high optical performance capable of supporting recent high pixelation, and an optical apparatus equipped with the optical system to be realized.

DETAILED DESCRIPTION OF THE PREFERRED EMBODIMENTS

Hereinafter, embodiments of the present invention will be described with reference to the accompanying drawings. FIGS. 1 to 5 are cross-sectional views of optical systems according to embodiments of the present invention, each corresponding to each of Examples 1 to 5. As the basic configurations of the examples shown in FIGS. 1 to 5 are identical and the illustration methods of FIGS. 1 to 5 are also identical, an optical system according to an embodiment of the present invention will be described hereinafter with reference mainly to FIG. 1.

Figure 1:
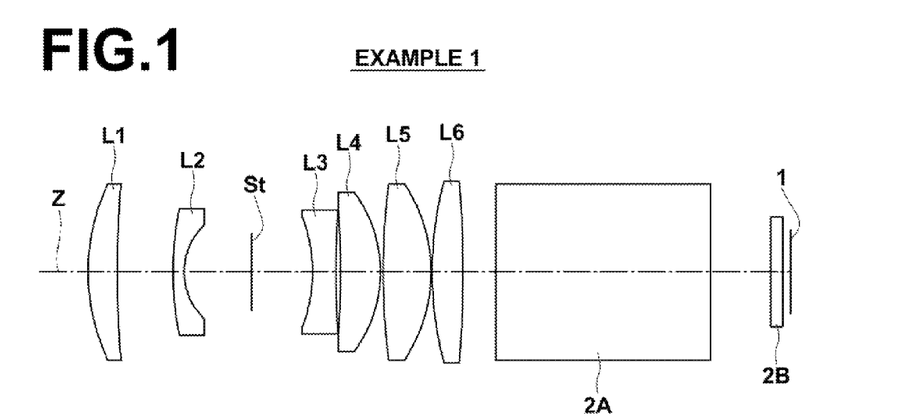
FIG. 1 is a cross-sectional view of an optical system of Example 1 of the present invention, illustrating the lens configuration thereof.

The optical system according to an embodiment of the present invention may be mounted, for example, on an imaging device and used as an imaging optical system for imaging a subject. Further, the optical system according to an embodiment of the present invention may be mounted on a projection display device and used as a projection optical system for projecting on a screen image information displayed on a light valve. FIG. 1 shows an example in which the optical system according to an embodiment of the present invention is mounted on a projection display device. In FIG. 1, the left side is the magnification side and the right side is the reduction side, and an optical member 2A, assuming a prism and the like, an optical member 2B, assuming various filters, a cover glass, and the like, and an image display surface 1 of a light valve are also illustrated.

In the projection display device, a light beam with image information given by the image display surface 1 enters the optical system through the optical members 2B and 2A and is projected on a screen (not shown) disposed on the left side direction of the drawing by the optical system.

FIG. 1 illustrates only one image display surface 1 for the simplicity of the drawing, but the projection display device may be configured to display a full color image by separating a light beam from the light source into three primary colors by a color separation optical system and disposing three light valves, each for each primary color.

The optical system of the present embodiment consists essentially of, in order from the magnification side, a first lens L1 having a positive refractive power with a convex surface on the magnification side, a second lens L2 having a negative refractive power, a third lens L3 having a negative refractive power, a fourth lens L4 having a positive refractive power, a fifth lens L5 having a positive refractive power, and a sixth lens L6 having a positive refractive power.

FIG. 1 shows an example in which an aperture stop St is disposed between the second lens L2 and the third lens L3. Note that the aperture stop St shown in FIG. 1 does not necessarily represent the size or the shape but indicates the position on the optical axis Z.

Assigning a positive refractive power to the first lens L1 is advantageous for the correction of distortion and lateral chromatic aberration. Forming the magnification side surface of the first lens L1 in a convex surface is advantageous for the correction of spherical aberration. The first lens L1 can be, for example, a positive meniscus lens with a convex surface on the magnification side.

Assigning a negative refractive power to the second lens L2 causes a back focus of an appropriate length to be ensured easily. The second lens L2 is preferably a meniscus lens with a concave surface on the reduction side and if that is the case, the generation amount of astigmatism may be suppressed.

Assigning a negative refractive power to the third lens L3 is advantageous for the correction of spherical aberration and longitudinal chromatic aberration. The magnification side surface of the third lens L3 is preferably a concave surface and if that is the case, spherical aberration is advantageously corrected. The third lens L3 can be, for example, a biconcave lens.

Assigning positive refractive powers to the fourth lens L4, the fifth lens L5, and the sixth lens L6 causes distortion and spherical aberration to be prevented easily from being aggravated, while maintaining telecentricity on the reduction side by allowing the positive refractive power to be shared by the three lenses. Maintaining telecentricity on the reduction side allows the optical system to be suitably used for a projection display device having a cross prism, a total reflection prism, or the like disposed between the lens system and the image display surface 1.

The reduction side surface of the lens L4 is preferably a convex surface and if that is the case, the generation amount of astigmatism may be suppressed. The fourth lens L4 can be, for example, a positive meniscus lens with a convex surface on the reduction side.

The reduction side surface of the fifth lens L5 is preferably a convex surface and if that is the case, the generation amount of astigmatism may be suppressed. If the reduction side surface of the fourth lens L4 and the reduction side surface of the fifth lens L5 are both convex surfaces, the generation amount of astigmatism may further be suppressed in comparison with the case in which only either one of the surfaces is a convex surface. The fifth lens L5 is preferably a biconvex lens and if that is the case, the generation amount of spherical aberration may be suppressed.

The magnification side surface of the sixth lens L6 is preferably a convex surface and if that is the case, the generation amount of spherical aberration may be suppressed. The sixth lens L6 can be, for example, a biconvex lens.

The optical system of the present embodiment may use an uncemented single lens for each of the first lens L1 to the sixth lens L6. The use of single lenses may improve design flexibility in comparison with the case in which cemented lenses are used, which is advantageous for realizing a high resolution lens system.

The optical system of the present embodiment preferably satisfies any one or any combination of the following conditional expressions (1) to (3):

$$0.17 < D2/f < 0.80 \tag{1}$$

$$-60 < vd1 - vd2 < -15 \tag{2}$$

$$0.25 < f/f1 < 0.70 \tag{3}$$

where
D2: distance on the optical axis between the first lens and the second lens
f: focal length of the entire system
vd1: Abbe number of the first lens with reference to d-line
vd2: Abbe number of the second lens with reference to d-line
f1: focal length of the first lens.

Preventing the optical system from falling to or below the lower limit of the conditional expression (1) allows chromatic aberration and distortion to be corrected satisfactorily. Preventing the optical system from exceeding the upper limit of the conditional expression (1) may result in that the overall length of the lens system is prevented from increasing excessively and the diameter of the first lens L1 is prevented from increasing largely. For further enhancing the foregoing advantageous effects of the conditional expression (1), the optical system preferably satisfies a conditional expression (1-1) given below:

$$0.20 < D2/f < 0.55 \tag{1-1}$$

Preventing the optical system from falling to or below the lower limit of the conditional expression (2) allows longitudinal chromatic aberration to be corrected satisfactorily. Preventing the optical system from exceeding the upper limit of the conditional expression (2) allows lateral chromatic aberration to be corrected satisfactorily. For further enhancing the foregoing advantageous effects of the conditional expression (2), the optical system preferably satisfies a conditional expression (2-1) given below:

$$-50 < vd1 - vd2 < -18 \tag{2-1}$$

Satisfying the conditional expression (3) allows lateral chromatic aberration and distortion to be corrected within an appropriate range. For further enhancing the foregoing advantageous effects of the conditional expression (3), the optical system preferably satisfies a conditional expression (3-1) given below:

$$0.30 < f/f1 < 0.60 \tag{3-1}$$

The foregoing preferable configurations may be combined arbitrarily and are preferably employed selectively, as appropriate, according to the matters required of the optical system. For example, an optical system with an F-number of 2.5 or less may be configured by appropriately employing the foregoing configurations. Optical systems of two aspects will be given hereinafter as preferable configurations that appropriately employ the foregoing configurations. In the optical systems of the first and second aspects described below, the foregoing preferable configurations may be selectively employed, as appropriate.

The optical system of the first aspect consists essentially of, in order from the magnification side, a first lens having a positive refractive power with a convex surface on the magnification side, a second lens having a negative refractive power, a third lens having a negative refractive power, a fourth lens having a positive refractive power, a fifth lens having a positive refractive power, and a sixth lens having a positive refractive power, and satisfies the foregoing conditional expressions (1) and (2).

The optical system of the second aspect consists essentially of, in order from the magnification side, a first lens having a positive refractive power with a convex surface on the magnification side, a second lens having a negative refractive power, a third lens having a negative refractive power, a fourth lens having a positive refractive power, a fifth lens having a positive refractive power, and a sixth lens having a positive refractive power, and satisfies the foregoing conditional expressions (1) and (3).

Next, specific examples of the optical system of the present invention will be described. Note that all the numerical data of the examples shown below are those normalized such that the focal length of the entire system is 1.000 and rounded at a predetermined digit.

Example 1

The configuration diagram of the optical system of Example 1 is as shown in FIG. 1. Lens data of the optical system of Example 1 are shown in Table 1 below. Table 1 shows, within the frame, numerical values when the magnification side conjugate distance (distance from the most magnification side surface to the screen) is 8.7.

The Si column in Table 1 indicates $i^{th}$ surface number when a number i (i=1, 2, 3, - - - ) is given to each surface of constituent elements in a serially increasing manner toward the reduction side with the magnification side surface of the most magnification side constituent element being taken as the first surface. The Ri column indicates the radius of curvature of $i^{th}$ surface and the Di column indicates the surface distance on the optical axis Z between $i^{th}$ surface and $(i+1)^{th}$ surface. The Ndj column indicates the refractive index of $j^{th}$ constituent element with respect to d-line (wavelength of 587.6 nm) when a number j (j=1, 2, 3, - - - ) is given to each constituent element in a serially increasing manner toward the reduction side with the most magnification side constituent element being taken as the first element, and the vdj column indicates the Abbe number of $j^{th}$ constituent element with reference to d-line.

The sign of the radius of curvature is positive if the surface shape is convex on the magnification side and negative if it is convex on the reduction side. Note that the aperture stop St and the optical members 2A, 2B are also included in the lens data, and the surface number column corresponding to the aperture stop St includes the word (St), as well as the surface number. The values at the bottom of the Di column indicates the surface distance between the optical member 2B and the image display surface 1.

Table 1 shows, as specs with respect to d-line, focal length "f" of the entire system, F-number "FNo.", and total angle of view 2ω (unit: degree) at the bottom outside the frame.

TABLE 1

Example 1

| Si | Ri | Di | Ndj | vdj |
|---|---|---|---|---|
| 1 | 1.15466 | 0.167 | 1.72342 | 37.95 |
| 2 | 6.00344 | 0.313 | | |
| 3 | 1.83343 | 0.062 | 1.48749 | 70.24 |
| 4 | 0.36238 | 0.382 | | |
| 5(St) | ∞ | 0.344 | | |
| 6 | −0.84639 | 0.130 | 1.78472 | 25.68 |
| 7 | 4.76528 | 0.027 | | |
| 8 | −4.33892 | 0.223 | 1.61800 | 63.33 |
| 9 | −0.76571 | 0.016 | | |
| 10 | 4.04892 | 0.271 | 1.49700 | 81.54 |
| 11 | −0.89990 | 0.006 | | |
| 12 | 1.99092 | 0.173 | 1.63854 | 55.38 |
| 13 | −6.25269 | 0.186 | | |
| 14 | ∞ | 1.211 | 1.63854 | 55.38 |
| 15 | ∞ | 0.338 | | |
| 16 | ∞ | 0.068 | 1.51633 | 64.14 |
| 17 | ∞ | 0.045 | | | f = 1.000,
FNo. = 2.40,
2ω = 26.6°

Figure 6:
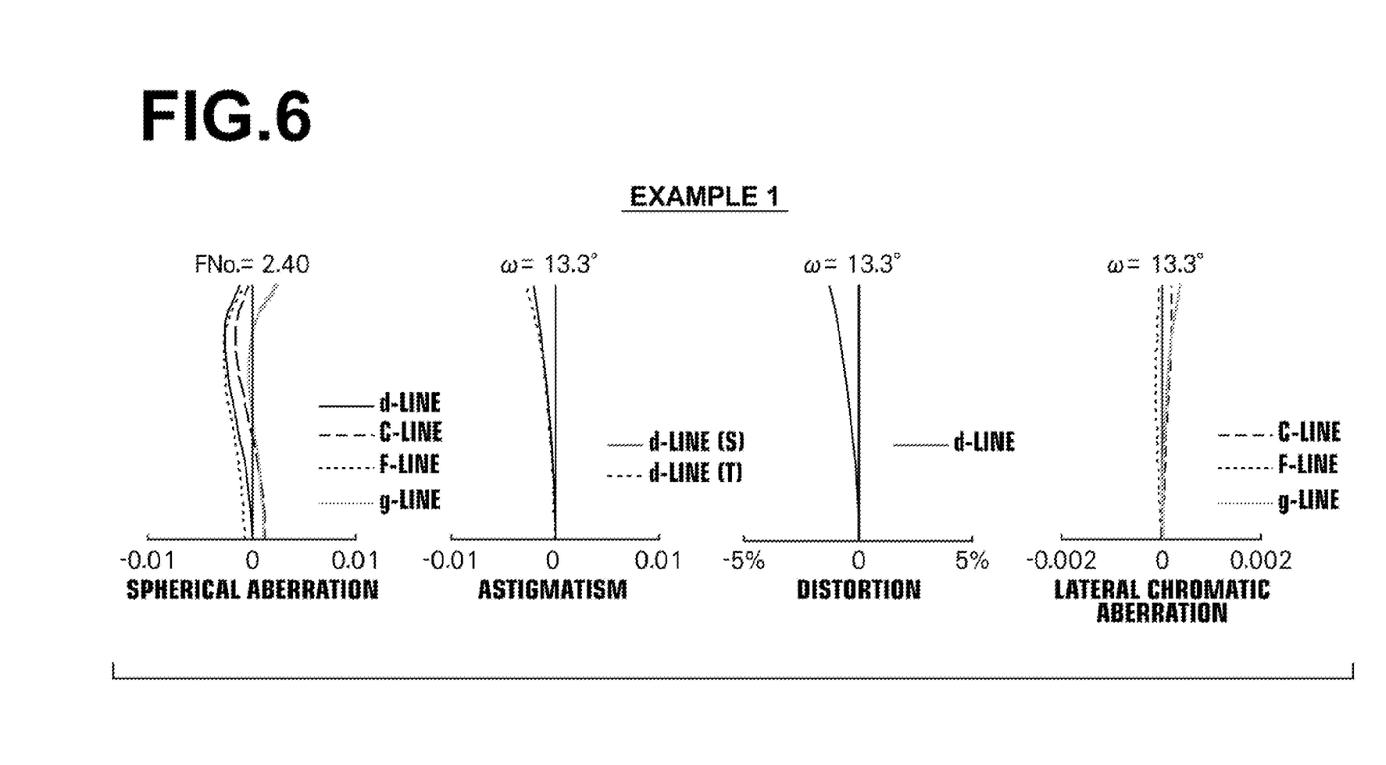
FIG. 6 shows aberration diagrams of the optical system of Example 1 of the present invention, in which a spherical aberration diagram, an astigmatism diagram, a distortion diagram, and a lateral chromatic aberration diagram are arranged in order from the left.

FIG. 6 shows, in order from the left, respective aberration diagrams of spherical aberration, astigmatism, distortion, and lateral chromatic aberration of the optical system of Example 1 when the magnification side conjugate distance is 8.7. In FIG. 6, the spherical aberration diagram shows aberrations with respect to d-line (wavelength 587.6 nm), C-line (wavelength 656.3 nm), F-line (wavelength 486.1 nm), and g-line (wavelength 435.8 nm) by the solid line, the long-dashed line, the short-dashed line, and the gray solid line respectively. The astigmatism diagram shows aberrations with respect to d-line in the sagittal direction and the tangential direction by the solid line and the dotted line respectively. The distortion diagram shows distortion with respect to d-line by the solid line. The lateral chromatic aberration diagram shows aberrations with respect to C-line, F-line, and g-line by the long-dashed line, the short-dashed line and the gray solid line respectively. The "FNo." in the spherical aberration diagram refers to F-number and "ω" in other aberration diagrams refers to half angle of view.

The symbols in the various data and their meanings, illustration method, and the fact that numerical values within the frame of the lens data and each aberration diagram are those when the magnification side conjugate distance is 8.7 are also applied to the following examples unless otherwise specifically described and a duplicated explanation will be omitted in the following description.

Example 2

Figure 2:
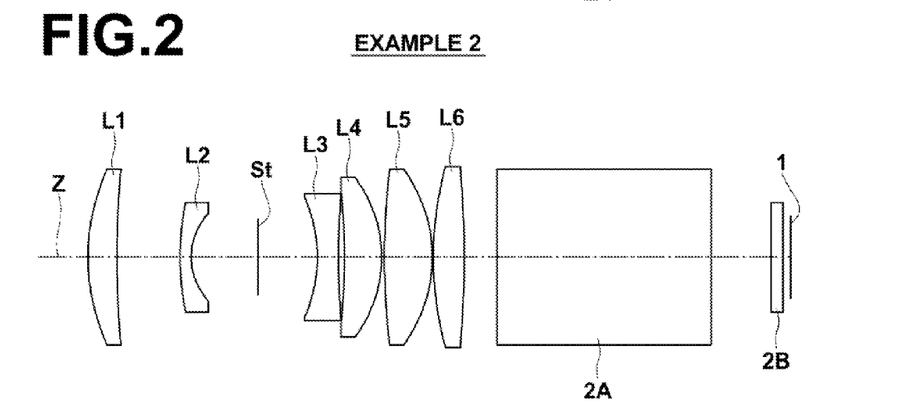
FIG. 2 is a cross-sectional view of an optical system of Example 2 of the present invention, illustrating the lens configuration thereof.
Figure 7:
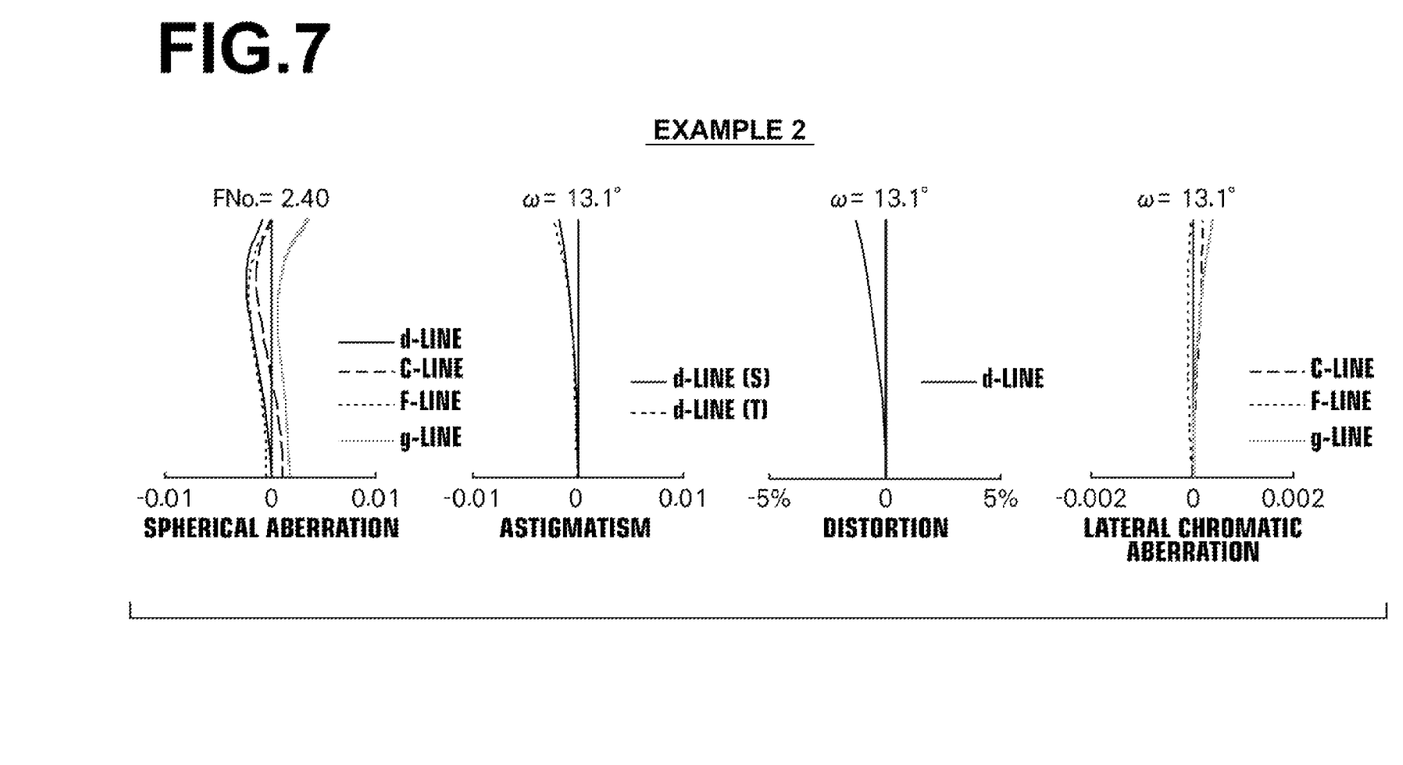
FIG. 7 shows aberration diagrams of the optical system of Example 2 of the present invention, in which a spherical aberration diagram, an astigmatism diagram, a distortion diagram, and a lateral chromatic aberration diagram are arranged in order from the left.

The configuration diagram of the optical system of Example 2 is as shown in FIG. 2. Lens data of the optical system of Example 2 are shown in Table 2 below. FIG. 7 shows, in order from the left, respective aberration diagrams of spherical aberration, astigmatism, distortion, and lateral chromatic aberration of the optical system of Example 2.

TABLE 2

Example 2

| Si | Ri | Di | Ndj | vdj |
|---|---|---|---|---|
| 1 | 1.17998 | 0.164 | 1.72342 | 37.95 |
| 2 | 5.56900 | 0.352 | | |
| 3 | 1.51312 | 0.062 | 1.48749 | 70.24 |

TABLE 2-continued

Example 2

| Si | Ri | Di | Ndj | vdj |
|---|---|---|---|---|
| 4 | 0.35479 | 0.376 | | |
| 5(St) | ∞ | 0.332 | | |
| 6 | −0.81786 | 0.117 | 1.78472 | 25.68 |
| 7 | 4.01055 | 0.034 | | |
| 8 | −3.43427 | 0.207 | 1.61800 | 63.33 |
| 9 | −0.74910 | 0.016 | | |
| 10 | 4.11193 | 0.269 | 1.49700 | 81.54 |
| 11 | −0.83877 | 0.006 | | |
| 12 | 1.92631 | 0.172 | 1.63854 | 55.38 |
| 13 | −5.62798 | 0.185 | | |
| 14 | ∞ | 1.199 | 1.63854 | 55.38 |
| 15 | ∞ | 0.335 | | |
| 16 | ∞ | 0.068 | 1.51633 | 64.14 |
| 17 | ∞ | 0.043 | | |

$f = 1.000$,
FNo. = 2.40,
$2\omega = 26.2°$

Example 3

Figure 3:
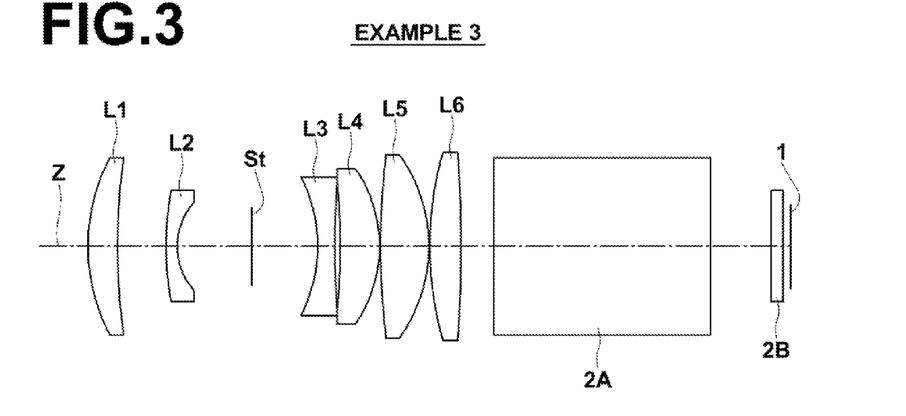
FIG. 3 is a cross-sectional view of an optical system of Example 3 of the present invention, illustrating the lens configuration thereof.
Figure 8:
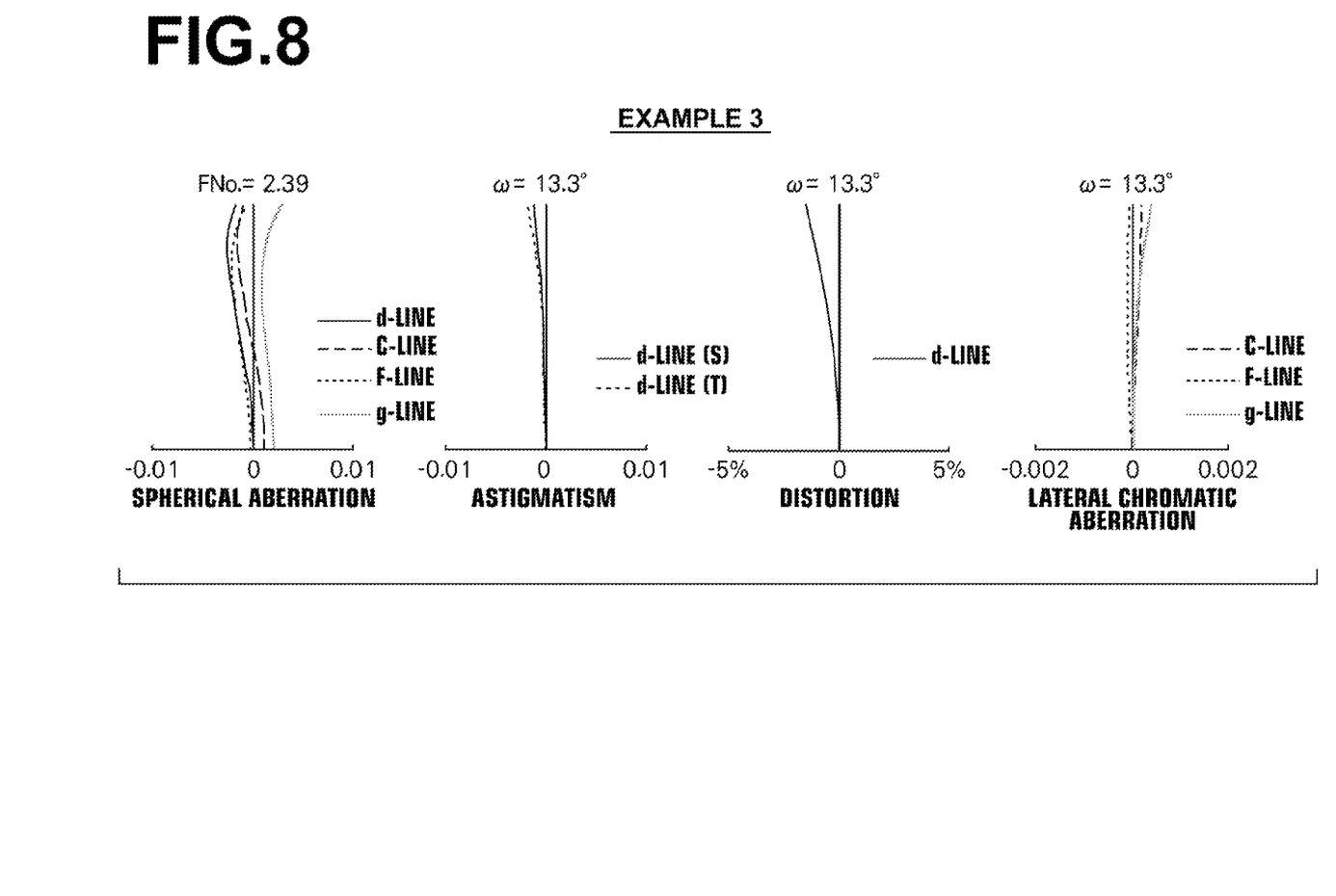
FIG. 8 shows aberration diagrams of the optical system of Example 3 of the present invention, in which a spherical aberration diagram, an astigmatism diagram, a distortion diagram, and a lateral chromatic aberration diagram are arranged in order from the left.

The configuration diagram of the optical system of Example 3 is as shown in FIG. 3. Lens data of the optical system of Example 3 are shown in Table 3 below. FIG. 8 shows, in order from the left, respective aberration diagrams of spherical aberration, astigmatism, distortion, and lateral chromatic aberration of the optical system of Example 3.

TABLE 3

Example 3

| Si | Ri | Di | Ndj | vdj |
|---|---|---|---|---|
| 1 | 1.05316 | 0.168 | 1.83400 | 37.16 |
| 2 | 3.76988 | 0.270 | | |
| 3 | 1.78319 | 0.062 | 1.56883 | 56.36 |
| 4 | 0.37220 | 0.418 | | |
| 5(St) | ∞ | 0.368 | | |
| 6 | −0.85320 | 0.095 | 1.78472 | 25.68 |
| 7 | 4.82589 | 0.030 | | |
| 8 | −3.87132 | 0.219 | 1.61800 | 63.33 |
| 9 | −0.77547 | 0.006 | | |
| 10 | 4.20777 | 0.271 | 1.49700 | 81.54 |
| 11 | −0.88174 | 0.006 | | |
| 12 | 1.94203 | 0.173 | 1.69680 | 55.53 |
| 13 | −7.54485 | 0.186 | | |
| 14 | ∞ | 1.209 | 1.63854 | 55.38 |
| 15 | ∞ | 0.338 | | |
| 16 | ∞ | 0.068 | 1.51633 | 64.14 |
| 17 | ∞ | 0.043 | | |

$f = 1.000$,
FNo. = 2.39,
$2\omega = 26.6°$

Example 4

Figure 4:
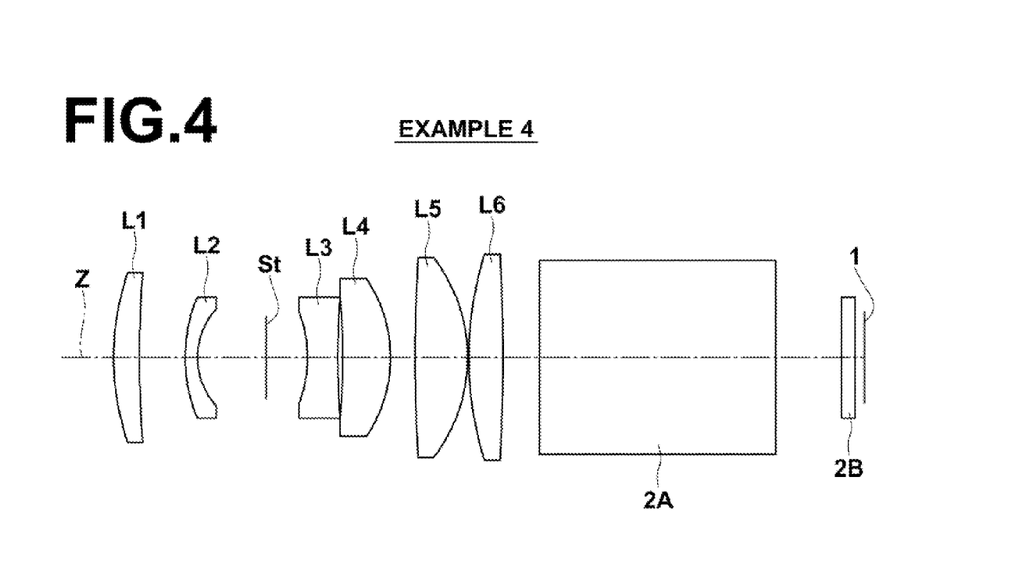
FIG. 4 is a cross-sectional view of an optical system of Example 4 of the present invention, illustrating the lens configuration thereof.
Figure 9:
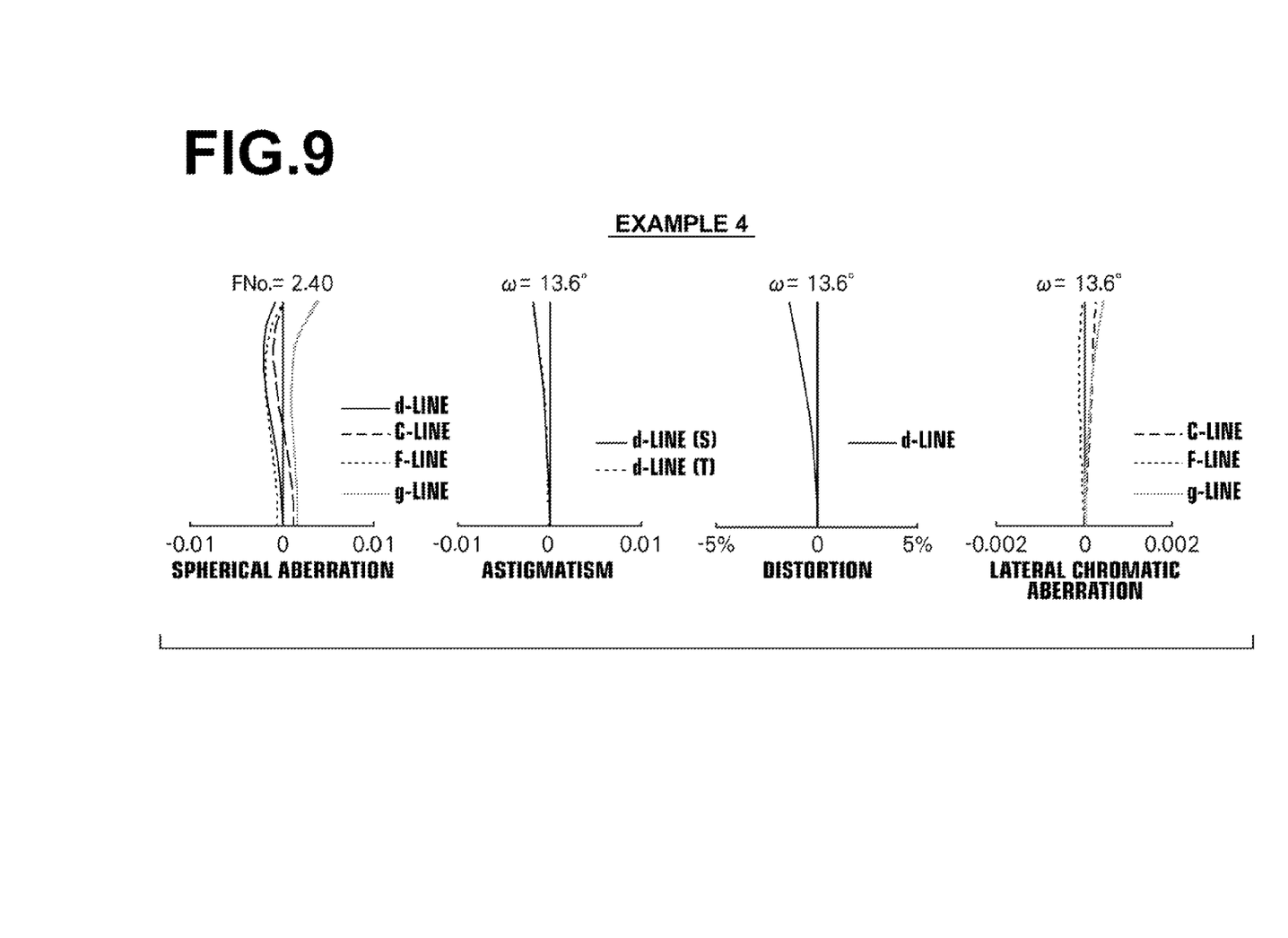
FIG. 9 shows aberration diagrams of the optical system of Example 4 of the present invention, in which a spherical aberration diagram, an astigmatism diagram, a distortion diagram, and a lateral chromatic aberration diagram are arranged in order from the left.

The configuration diagram of the optical system of Example 4 is as shown in FIG. 4. Lens data of the optical system of Example 4 are shown in Table 4 below. FIG. 9 shows, in order from the left, respective aberration diagrams of spherical aberration, astigmatism, distortion, and lateral chromatic aberration of the optical system of Example 4.

TABLE 4

Example 4

| Si | Ri | Di | Ndj | vdj |
|---|---|---|---|---|
| 1 | 1.36839 | 0.138 | 1.76182 | 26.52 |
| 2 | 6.00084 | 0.239 | | |
| 3 | 0.83250 | 0.064 | 1.48749 | 70.24 |
| 4 | 0.37825 | 0.361 | | |
| 5(St) | ∞ | 0.217 | | |
| 6 | −0.66549 | 0.159 | 1.84666 | 23.78 |
| 7 | 3.94081 | 0.028 | | |
| 8 | −3.33129 | 0.249 | 1.71299 | 53.87 |
| 9 | −0.74639 | 0.128 | | |
| 10 | 7.82867 | 0.278 | 1.49700 | 81.54 |
| 11 | −0.85917 | 0.006 | | |
| 12 | 1.83648 | 0.178 | 1.63854 | 55.38 |
| 13 | −10.27199 | 0.191 | | |
| 14 | ∞ | 1.242 | 1.63854 | 55.38 |
| 15 | ∞ | 0.347 | | |
| 16 | ∞ | 0.070 | 1.51633 | 64.14 |
| 17 | ∞ | 0.049 | | |

$f = 1.000$,
FNo. = 2.40,
$2\omega = 27.2°$

Example 5

Figure 5:
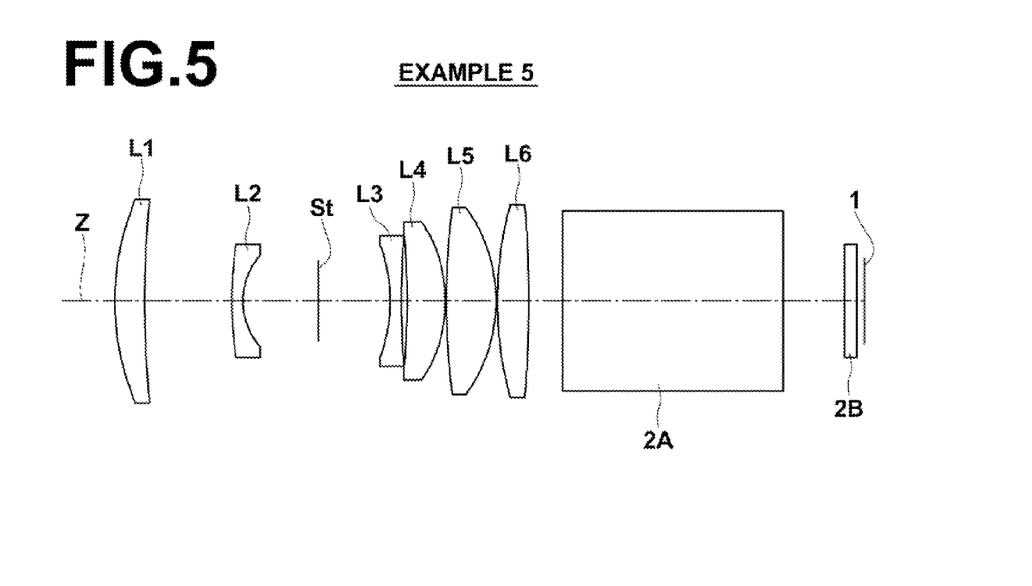
FIG. 5 is a cross-sectional view of an optical system of Example 5 of the present invention, illustrating the lens configuration thereof.
Figure 10:
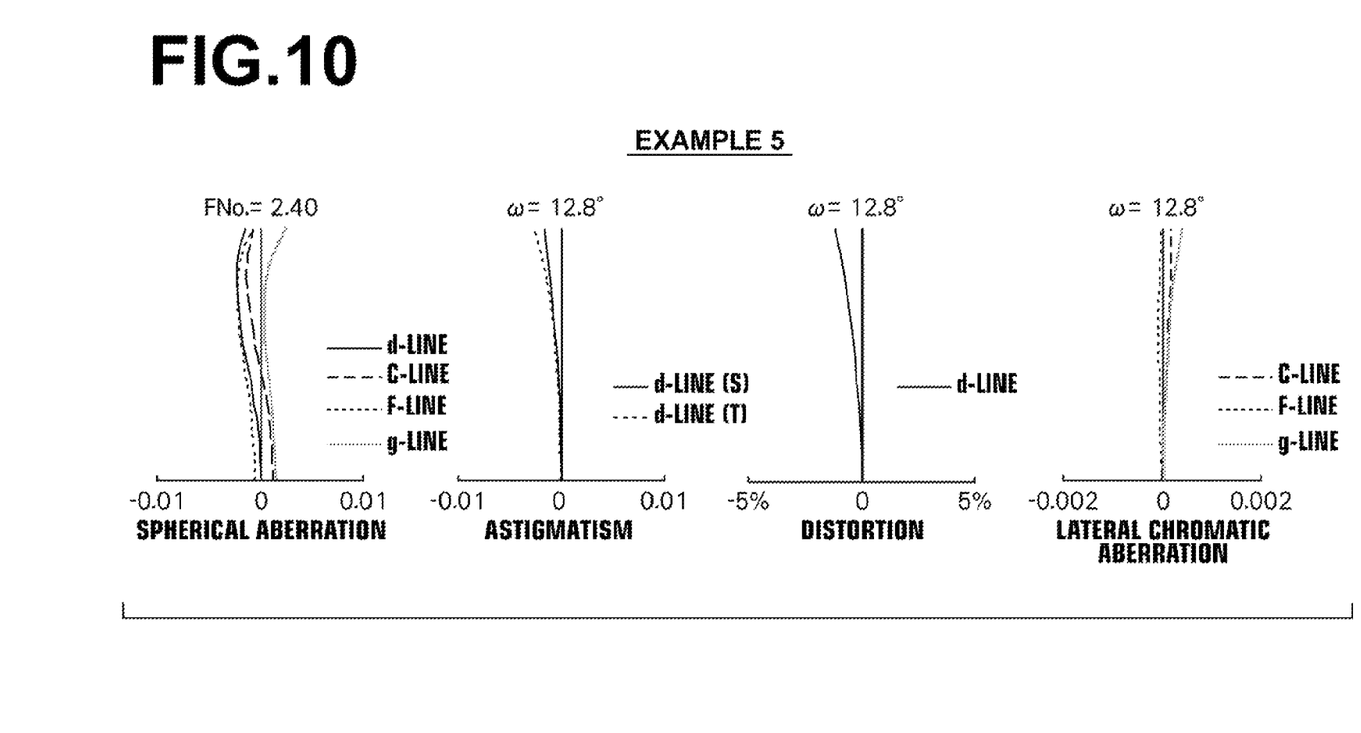
FIG. 10 shows aberration diagrams of the optical system of Example 5 of the present invention, in which a spherical aberration diagram, an astigmatism diagram, a distortion diagram, and a lateral chromatic aberration diagram are arranged in order from the left.

The configuration diagram of the optical system of Example 5 is as shown in FIG. 5. Lens data of the optical system of Example 5 are shown in Table 5 below. FIG. 10 shows, in order from the left, respective aberration diagrams of spherical aberration, astigmatism, distortion, and lateral chromatic aberration of the optical system of Example 5.

TABLE 5

Example 5

| Si | Ri | Di | Ndj | vdj |
|---|---|---|---|---|
| 1 | 1.39235 | 0.160 | 1.83481 | 42.72 |
| 2 | 5.74837 | 0.460 | | |
| 3 | 1.88546 | 0.060 | 1.49700 | 81.54 |
| 4 | 0.36374 | 0.398 | | |
| 5(St) | ∞ | 0.382 | | |
| 6 | −0.87086 | 0.060 | 1.78472 | 25.68 |
| 7 | 4.45420 | 0.030 | | |
| 8 | −3.69923 | 0.204 | 1.61800 | 63.33 |
| 9 | −0.75516 | 0.006 | | |
| 10 | 3.99746 | 0.262 | 1.49700 | 81.54 |
| 11 | −0.84768 | 0.006 | | |
| 12 | 1.94098 | 0.167 | 1.69680 | 55.53 |
| 13 | −5.78046 | 0.180 | | |
| 14 | ∞ | 1.168 | 1.63854 | 55.38 |
| 15 | ∞ | 0.326 | | |
| 16 | ∞ | 0.066 | 1.51633 | 64.14 |
| 17 | ∞ | 0.040 | | |

$f = 1.000$,
FNo. = 2.40,
$2\omega = 25.6°$

Table 6 shows values corresponding to the conditional expressions (1) to (3) for Examples 1 to 5. Note that the values shown in Table 6 are those with reference to d-line.

TABLE 6

| Expression No. | | Example 1 | Example 2 | Example 3 | Example 4 | Example 5 |
|---|---|---|---|---|---|---|
| (1) | D2/f | 0.313 | 0.352 | 0.270 | 0.239 | 0.460 |
| (2) | vd1 − vd2 | −32.29 | −32.29 | −19.20 | −43.72 | −38.82 |
| (3) | f/f1 | 0.513 | 0.491 | 0.586 | 0.435 | 0.462 |

As can be seen from the foregoing data, each of the imaging lenses of Examples 1 to 5 is a six-lens system configured compact, has a small F-number of 2.4 and a sufficient back focus to insert a prism and the like, and realizes high optical performance with well corrected aberrations.

Figure 11:
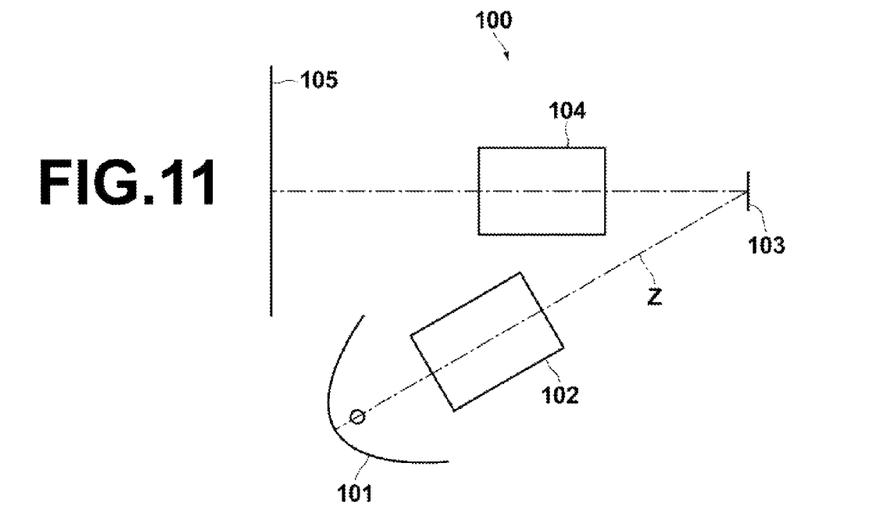
FIG. 11 is a schematic configuration diagram of an optical apparatus according to an embodiment of the present invention.

Next, embodiments of an optical apparatus that uses the optical system of the present invention will be described with reference to FIGS. 11, 12, 13A, and 13B. FIG. 11 is a schematic configuration diagram of a projection display apparatus according to a first embodiment of the optical apparatus of the present invention. The projection display apparatus 100 shown in FIG. 11 includes a light source 101, an illumination optical system 102, a DMD 103 as a light valve, and a projection lens 104 which is an optical system according to an embodiment of the present invention. Note that each constituent element described above is schematically illustrated. A light beam emitted from the light source 101 is selected in time series and converted to each of three primary color light beams (R, G, B) by a color wheel (not shown) and incident on the DMD 103 after being homogenized in light intensity distribution on a cross-section orthogonal to the optical axis Z by the illumination optical system 102. In response to a change in color of the incident light, modulation is switched to that color in the DMD 103. The light optically modulated by the DMD 103 enters the projection lens 104. The projection display apparatus 100 is configured such that the exit pupil position of the illumination optical system 102 substantially coincides with the entrance pupil position of the projection lens 104 (corresponding to the reduction side pupil position of the projection lens 104). The projection lens 104 projects an optical image formed by the optically modulated light on the screen 105.

Figure 12:
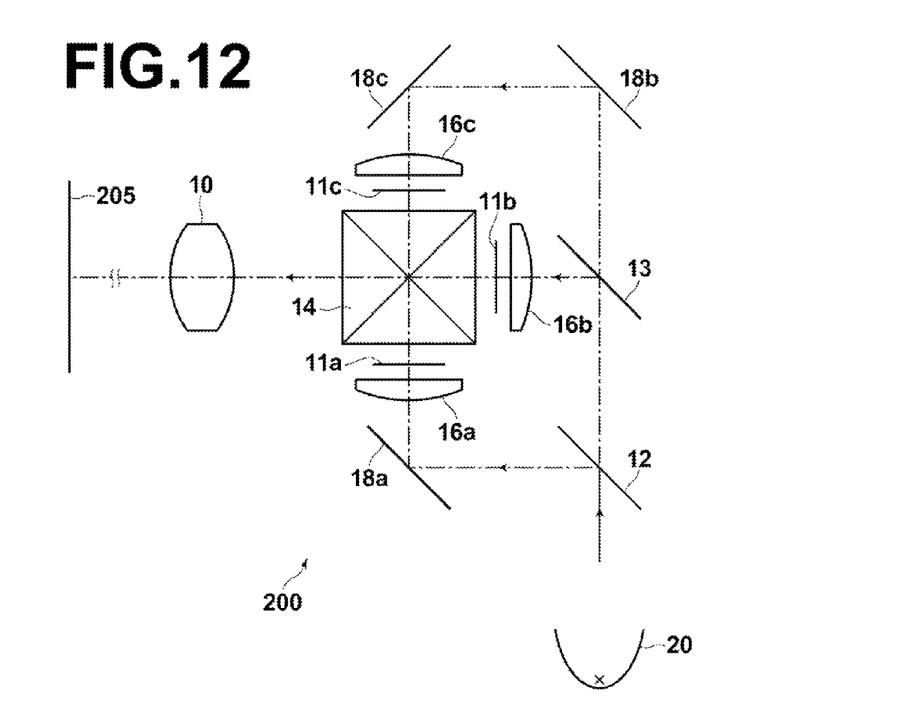
FIG. 12 is a schematic configuration diagram of an optical apparatus according to another embodiment of the present invention.

FIG. 12 is a schematic configuration diagram of a projection display apparatus according to a second embodiment of the optical apparatus of the present invention. The projection display apparatus 200 shown in FIG. 12 includes a projection lens 10 which is an optical system according to an embodiment of the present invention, a light source 20, transmissive display elements 11a to 11c as light valves, each corresponding to each color light, dichroic mirrors 12, 13 for color separation, a cross-dichroic prism 14 for color combining, condenser lenses 16a to 16c, and total reflection mirrors 18a to 18c for deflecting optical paths. Note that the projection lens 10 is depicted schematically in FIG. 12. An integrator is disposed between the light source 20 and the dichroic mirror 12, but it is omitted in FIG. 12.

White light from the light source 20 is separated into three colored beams (G light beam, B light beam, R light beam) by the dichroic mirrors 12, 13. The three colored beams pass through the respective condenser lenses 16a to 16c and enter the transmissive display elements 11a to 11c corresponding to the respective colored beams and optically modulated. The optically modulated colored beams are color combined by the cross-dichroic mirror 14 and the color combined beam enters the projection lens 10. The projection lens 10 projects an optical image formed by the light optically modulated by the transmissive display elements 11a to 11c on the screen 205.

Figure 13A:
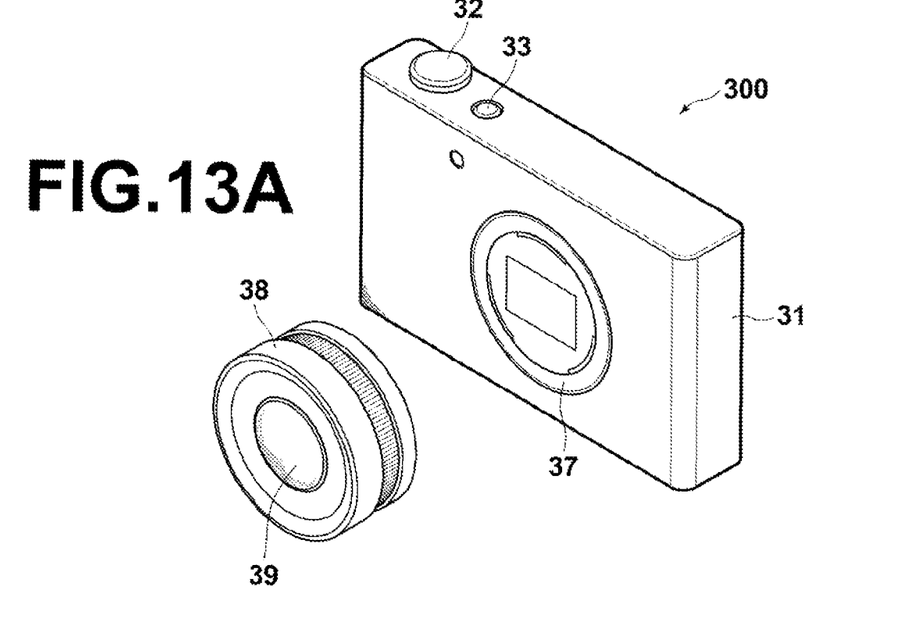
FIG. 13A is a front perspective view of an optical apparatus equipped with the optical system of the present invention.
Figure 13B:
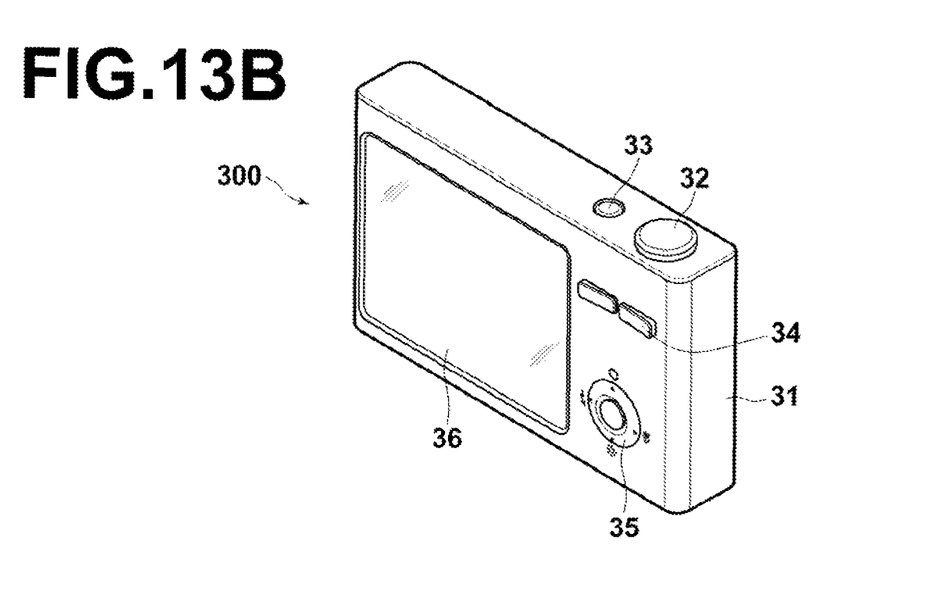
FIG. 13B is a rear perspective view of the optical apparatus shown in FIG. 13A.

FIGS. 13A and 13B are external views of a camera 300 which is an imaging apparatus according to a third embodiment of the optical apparatus of the present invention. FIG. 13A is a perspective view of the camera 300 viewed from the front side and FIG. 13B is a perspective view of the camera 300 viewed from the rear side. The camera 300 is a single-lens digital camera without a reflex viewfinder on which an interchangeable lens 38 is removably mounted. The interchangeable lens 38 includes an imaging lens 39, which is an optical system according to an embodiment of the present invention, housed in a lens barrel.

The camera 300 has a camera body 31 and includes a shutter button 32 and a power button 33 on the upper surface of the camera body 31. Operation parts 34 and 35, and a display 36 are provided on the rear surface of the camera body 31. The display 36 is used to display a captured image or an image within the angle of view before being captured.

The camera body 31 is provided with an imaging aperture in the front center from which light from an imaging target enters and a mount 37 is provided at the position corresponding to the imaging aperture, whereby the interchangeable lens 38 is mounted on the camera body 31 via the mount 37.

The camera body 31 includes inside thereof an image sensor, such as a charge coupled device (CCD) or the like, (not shown) that outputs an image signal according a subject image formed by the interchangeable lens 38, a signal processing circuit that processes the image signal outputted from the image sensor and generates an image, a recording medium for recording the generated image, and the like. The camera 300 is capable of taking a still image or a motion picture when the shutter button 32 is pressed and the image data obtained by the imaging are recorded on the recording medium.

So far, the present invention has been described by way of embodiments and Examples, but the present invention is not limited to the foregoing embodiments and Examples and various modifications may be made. For example, values of the radius of curvature of each lens, surface distance, refractive index, Abbe number, and the like may be changed, as appropriate.

Further, the optical apparatus of the present invention is not limited to those of the foregoing configurations. For example, light valves and optical members used for beam splitting or beam combining are not limited to those having the foregoing configurations, and various modifications may be made. Further, in the embodiments of the imaging apparatus, the description has been made of a case in which the optical system of the present invention is applied to a single-lens digital camera without a reflex viewfinder, but the optical system of the present invention may also be applied, for example, to single-lens reflex cameras, film cameras, video cameras, and the like.

What is claimed is:

1. An optical system, consisting of, in order from the magnification side, a first lens having a positive refractive power with a convex surface on the magnification side, a second lens having a negative refractive power, a third lens having a negative refractive power, a fourth lens having a positive refractive power, a fifth lens having a positive refractive power, and a sixth lens having a positive refractive power, wherein the following conditional expressions (1) and (2) are satisfied:

$$0.17 < D2/f < 0.80 \quad (1)$$

$$-60 < vd1 - vd2 < -15 \quad (2)$$

where

D2: distance on the optical axis between the first lens and the second lens f: focal length of the entire system vd1: Abbe number of the first lens with reference to d-line vd2: Abbe number of the second lens with reference to d-line.

2. The optical system of claim 1, wherein the following conditional expression (3) is satisfied:

$$0.25 < f/f1 < 0.70 \qquad (3)$$

where
  f1: focal length of the first lens.

3. The optical system of claim 1, wherein the magnification side surface of the third lens is a concave surface.

4. The optical system of claim 1, wherein the second lens is a meniscus lens with a concave surface on the reduction side.

5. The optical system of claim 1, wherein the reduction side surface of the fourth lens is a convex surface.

6. The optical system of claim 1, wherein the reduction side surface of the fifth lens is a convex surface.

7. The optical system of claim 1, wherein the fifth lens is a biconvex lens.

8. The optical system of claim 1, wherein the magnification side surface of the sixth lens is a convex surface.

9. The optical system of claim 1, wherein the following conditional expression (1-1) is satisfied:

$$0.20 < D2/f < 0.55 \qquad (1\text{-}1).$$

10. The optical system of claim 1, wherein the following conditional expression (2-1) is satisfied:

$$-50 < vd1 - vd2 < -18 \qquad (2\text{-}1)$$

where
  vd1: Abbe number of the first lens with reference to d-line
  vd2: Abbe number of the second lens with reference to d-line.

11. The optical system of claim 1, wherein the following conditional expression (3-1) is satisfied:

$$0.30 < f/f1 < 0.60 \qquad (3\text{-}1)$$

where
  f1: focal length of the first lens.

12. An optical apparatus provided with the optical system of claim 1.

13. An optical system, consisting of, in order from the magnification side, a first lens having a positive refractive power with a convex surface on the magnification side, a second lens having a negative refractive power, a third lens having a negative refractive power, a fourth lens having a positive refractive power, a fifth lens having a positive refractive power, and a sixth lens having a positive refractive power, wherein the following conditional expressions (1) and (3) are satisfied:

$$0.17 < D2/f < 0.80 \qquad (1)$$

$$0.25 < f/f1 < 0.70 \qquad (3)$$

where
  D2: distance on the optical axis between the first lens and the second lens
  f: focal length of the entire system
  f1: focal length of the first lens.

14. The optical system of claim 13, wherein the following conditional expression (1-1) is satisfied:

$$0.20 < D2/f < 0.55 \qquad (1\text{-}1).$$

15. The optical system of claim 13, wherein the following conditional expression (3-1) is satisfied:

$$0.30 < f/f1 < 0.60 \qquad (3\text{-}1).$$

16. An optical apparatus provided with the optical system of claim 13.

* * * * *